(12) United States Patent
Batni et al.

(10) Patent No.: US 6,490,450 B1
(45) Date of Patent: Dec. 3, 2002

(54) CAPTURING AND MODIFYING OF MOBILE SUBSCRIBER INFORMATION

(75) Inventors: Ramachendra Prahlada Batni, Phoenix, AZ (US); Axel Michael Christiansen, Glendale, AZ (US); Baijun Zhao, Phoenix, AZ (US)

(73) Assignee: AG Communication Systems Corporation, Phoenix, AZ (US)

( * ) Notice: Subject to any disclaimer, the term of this patent is extended or adjusted under 35 U.S.C. 154(b) by 0 days.

(21) Appl. No.: 09/448,749

(22) Filed: Nov. 24, 1999

(51) Int. Cl.[7] ................................................. H04Q 7/22
(52) U.S. Cl. ........................ 455/433; 455/435; 455/426; 455/406
(58) Field of Search ................................. 455/432, 433, 455/426, 406, 408, 407, 635; 379/114.28, 221

(56) References Cited

U.S. PATENT DOCUMENTS

| | | | | |
|---|---|---|---|---|
| 5,377,186 A | * | 12/1994 | Wegner et al. ................. | 370/62 |
| 5,915,220 A | * | 6/1999 | Chelliah ....................... | 455/435 |
| 6,029,062 A | * | 2/2000 | Hanson ......................... | 455/408 |
| 6,035,193 A | * | 5/2000 | Buhrmann et al. ............ | 455/426 |
| 6,070,067 A | * | 5/2000 | Nguyen et al. ............... | 455/407 |
| 6,075,855 A | * | 6/2000 | Christiansen et al. ........ | 379/221 |
| 6,169,898 B1 | * | 1/2001 | Hsu et al. ..................... | 455/432 |
| 6,181,935 B1 | * | 1/2001 | Gossman et al. ............. | 455/433 |
| 6,373,930 B1 | * | 4/2002 | McConnell ............. | 379/114.28 |
| 6,393,269 B1 | * | 5/2002 | Hartmaier et al. ........... | 455/406 |
| 2001/0041553 A1 | * | 11/2001 | Chang et al. ................. | 455/406 |
| 2001/0041555 A1 | * | 11/2001 | Lilge ........................... | 455/406 |
| 2002/0052212 A1 | * | 5/2002 | Aschir ......................... | 455/466 |

* cited by examiner

*Primary Examiner*—Edward F. Urban
*Assistant Examiner*—Henry M. Quach
(74) *Attorney, Agent, or Firm*—David J. Zwick (57) ABSTRACT

A system and method for capturing and modifying roaming mobile subscriber information such as Serving MSCID, cell and sector location information, original dialed digits, subscriber profile and return address point code in support of service applications, such as wireless prepaid service for roaming subscribers. A network platform is inserted into the signaling path between a roaming subscriber's HLR and all Serving MSCs. The network platform intercepts messages exchanged between the roaming subscriber's Serving MSC and HLR, and extracts and stores information such as Serving MSCID, cell and sector data. The network platform may also modify the exchanged messages in support of service applications.

15 Claims, 6 Drawing Sheets

CAPTURING AND MODIFYING OF MOBILE SUBSCRIBER INFORMATION

FIELD OF THE INVENTION

The present invention relates to wireless telecommunications services, and more particularly to capturing or modifying mobile subscriber information such as location information, as indicated by Serving MSCID, and cell and sector location, and other information, such as original dialed digits and subscriber profile, for use by service applications.

BACKGROUND OF THE INVENTION

Wireless Prepaid Service (WPS) is an offering by wireless service providers that allows a subscriber to charge airtime and other fees against a positive balance in the subscriber's account. Periodically, the subscriber replenishes the account balance so as to allow further service usage which may incur charges, such as airtime, voice messaging, etc. If the subscriber's account balance drops below a certain threshold, further calls are not allowed, and in certain arrangements, in-process calls are terminated.

One system for delivering wireless prepaid services in an Integrated Services Digital Network User Part (ISUP) network is based on U.S. Pat. No. 5,377,186 to Wegner, et al., and also on U.S. patent application 09/020,351, filed Feb. 9, 1998, assigned to the assignee of the present invention, both of which are herein incorporated by reference. The system uses ISUP loop-around trunks to connect a Mobile Switching Center (MSC) to a WPS Service Control Point (SCP), where the WPS airtime usage and other charges are tracked. All signaling for calls originating from or terminating to a WPS subscriber are routed through the WPS SCP.

All WPS systems are designed to track airtime usage and charges for WPS subscriber calls originating in the subscriber's home service area. However, current WPS systems using ISUP loop-around trunks or WPS point solutions connected to an MSC do not have the ability to determine and track roaming charges based on a roaming WPS subscriber's Serving MSC (SMSC). The primary reason for the inability to charge variable roaming rates based on a WPS roamer's location is that the common signaling protocols used to communicate between the MSC and the WPS product, such as ISUP, do not support parameters for Mobil Switching Center ID (MSCID), cell and sector.

One possible technique to determine a variable roaming rate for calls originating from a WPS roamer would be for each provider to assign a unique "800" backhaul number to each out-of-area SMSC in the network. Since calls originating from a roamer are almost always backhauled from the SMSC to an MSC in the subscriber's home network, a WPS roaming rate based on the unique SMSC backhaul number could be determined. The problem with this technique is that it uses a large number of scarce network resources, in the form of "800" and other directory numbers, that could better be used to serve revenue generating customers.

SUMMARY OF THE INVENTION

It is the primary object of the present invention to provide a system and method to capture Serving MSCID and cell and sector within the Serving MSC area for roaming wireless subscribers, and make this information available to service applications, such as wireless prepaid service. It is a further object of the invention to implement the method without requiring programming logic changes to established network elements, including Home Location Registers (HLRs), Visitor Location Registers (VLRs) and MSCs. It is a further object of the invention to implement the method with optimal use of scarce network resources, such as "800" and other directory numbers.

The invention of applicants is based on inserting a network platform, referred to hereinafter as an "Intercept Location Register" (ILR), into the signaling path between the HLR of the roaming subscriber and all SMSCs. The ILR performs its functions in a transparent manner from the perspectives of the HLR and the SMSC. The HLR and SMSC both think they are effectively communicating directly to each other following normal wireless intersystem operations.

By being in the signaling path between the HLR and SMSC, the ILR can perform certain unique functions. In particular, the ILR can save information present in the messages exchanged between the HLR and SMSC, such as the MSCID, cell and sector values included in the Registration message from the SMSC to the HLR for a roaming WPS subscriber, for subsequent use by a WPS SCP application for, for example, variable roaming rate determinations. The ILR can also modify messages exchanged between the HLR and SMSC to assist service applications.

In the preferred embodiment, the ILR sends messages it receives from SMSCs to the HLR and sends messages it receives from the HLR to SMSCs without significant modification, except for Registration Notification (REGNOT) and response (regnot) messages that are associated with WPS subscribers' Mobile Identification Numbers (MINs), maintained in a WPS MIN database on the ILR. In all cases, the ILR modifies the Serving MSCID parameter in messages it receives from the SMSC to the HLR to point to the ILR, so that response messages from the HLR will be returned to the ILR rather than directly to the SMSC.

When the ILR receives a REGNOT message associated with a WPS subscriber from a SMSC, it stores the MSCID, cell and sector included in the REGNOT message and passes the message to the HLR. When the ILR receives the regnot response message from the HLR, the regnot message is modified to include a hotline directory number (DN) that directs all calls originated by the roaming subscriber to be backhauled through the subscriber's Home MSC (HMSC), or an equivalent MSC that has ISUP loop-around trunks, which enable the call's ISUP signaling to be passed through the WPS SCP.

When subsequent calls are originated by or terminated to the roaming WPS subscriber, the subscriber's Serving MSCID and cell and sector that are stored in the ILR can be accessed by the WPS SCP application for variable roaming rate determination.

This technique can be used for roaming subscribers in home or foreign networks.

DESCRIPTION OF THE PREFERRED EMBODIMENT

In the first embodiment of the present invention, the network protocol used for call control is Signalling System 7 Integrated Services Digital Network User Part (ISUP), as described in American National Standards Institute (ANSI) standard T1.113-1995, "Signalling System Number 7 (SS7)-Integrated Services Digital Network (ISDN) User Part," 1995, ANSI, which is hereby incorporated by reference. The network protocol used for communication between the Location Registers, including the ILR of the present invention, is American National Standards Institute (ANSI) standard 41-D, as described in standards document series ANSI-41-D, "Cellular Radiotelecommunications Intersystem Operations," 1997, ANSI, which is hereby incorporated by reference.

Figure 1:
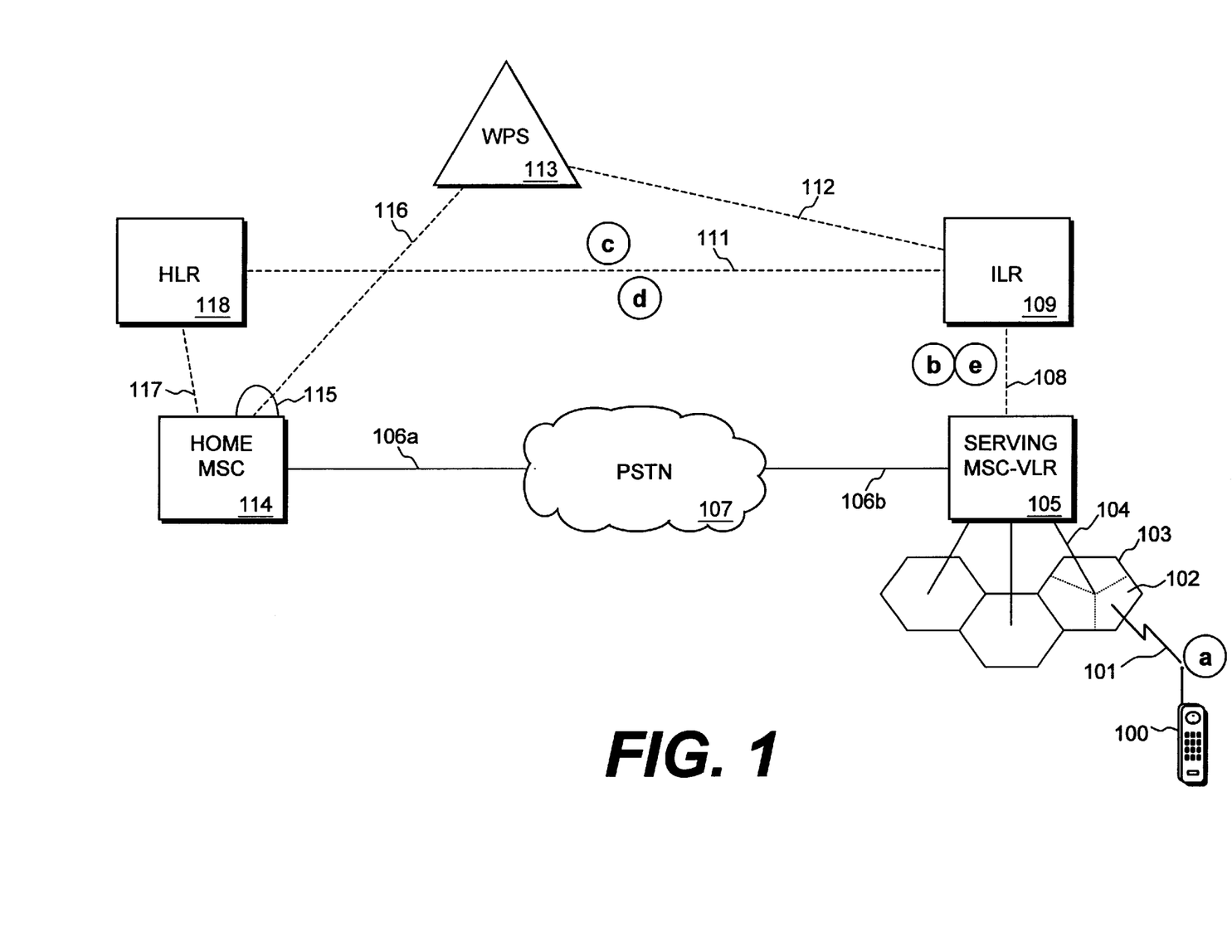
FIG. 1 shows a block diagram of a first embodiment of a wireless prepaid system of the present invention showing the general message flow for roaming registration.

FIG. 1 is a block diagram of a first embodiment of a wireless prepaid system of the present invention showing the message flow for roaming registration. Mobile subscriber (MS) 100 communicates over radio-telecommunications link 101 with a cellular antenna serving geographic cell 103. Cell 103 is divided into a plurality of sectors, for example sector 102. The cellular antenna serving geographic cell 103 recognizes that MS 100 is transmitting within sector 102, and makes this information available to SMSC 105 as part of the MS registration process.

SMSC 105 is a mobile switching center with standard functionality. For purposes of illustration, VLR functionality is shown as integrated with SMSC 105, but need not be. SMSC 105 is connected to one or more cellular antennae over trunk connections, for example, 104. SMSC 105 is also connected to HMSC 114 through Public Switched Telephone Network (PSTN) 107 over connections 106. PSTN 107 supports signaling paths between SMSC 105 and HMSC 114 over connections 106 which, in a first embodiment, support end to end SS7/ISUP signaling.

HMSC 114 is a mobile switching center with standard functionality. For purposes of illustration, HLR 118 functionality is shown as discrete from HMSC 114, but need not be. HLR 118 is connected to HMSC 114 over signaling path 117. HMSC 114 includes one or more ISUP loop-around trunks, one of which is shown at 115. Loop-around trunk 115 has an associated signaling path 116 connected to WPS SCP 113. The signaling link associated with loop-around trunk 115 is allocated to WPS SCP 113.

WPS SCP 113 is a service control point that supports a wireless prepaid service application as generally described in Wegner et al, and U.S. patent application 09/020351. Briefly, WPS subscribers local to HMSC 114 are routed to loop-around trunk 115. WPS SCP 113, which appears to HMSC 114 as a switch, receives the ISUP IAM message associated with the local WPS subscriber call on the portion of signaling path 116 controlling the outbound side of loop-around trunk 115. WPS SCP 113 then performs functions associated with the WPS call, for example initializing call timers. WPS SCP 113 then sends an IAM message over the portion of signaling path 116 controlling the inbound side of loop-around trunk 115 requesting the call be routed through the inbound side of loop-around trunk 115 to the originally dialed number. In this manner, WPS SCP 113 remains in the call path and is able to track call related data such as call duration. When the call is terminated, release messages received by WPS SCP 113 cause the SCP to stop the call timer and, for example, update a subscriber database to debit the WPS subscriber's account.

The elements described so far, namely MS 100, SMSC 105, cell 102 and sector 103, PSTN 107, HMSC 114, ISUP loop-around trunk 115 and associated signaling path 116, HLR 118, and SCP 113, are all well known in the art. In addition, the WPS service application utilizing ISUP loop-around trunk 115 and WPS SCP 113 is also known in the art.

The invention of Applicants includes a new network element referred to as Intercept Location Register (ILR) 109, which is connected to HLR 118 over signaling path 111 and connected to SMSC 105 over signaling path 108. This signaling path between HLR 118 and SMSC 105 that includes ILR 109 is in lieu of the prior art directly connected signaling path between HLR 118 and SMSC 105. ILR 109 is also connected to WPS SCP 113 over connection 112. ILR 109 is a network element that resides between HLR 118 and SMSC 105 and intercepts messages passed between the two. ILR 109 can extract and store information contained in the intercepted messages or modify the messages before passing them to their destination.

SMSC 105 is provisioned such that the point code address of ILR 109 is substituted for the address of the HLR 118 in the table used to route signaling messages from SMSC 105 to the roaming subscriber's HLR 118. Similarly, HLR 118 is provisioned such that the point code address of ILR 109 is substituted for the address of the SMSC 105 in the table used to route signaling messages from the roaming subscriber's HLR 118 to SMSC 105. Another table is provisioned in ILR 109 that relates the MIN of MS 100 to HLR 118 and to SMSC 105. This table allows ILR 109 to forward messages relating to MS 100 between SMSC 105 and HLR 118. To HLR 118, ILR 109 appears as the VLR of SMSC 105, and to SMSC 105, ILR 109 appears as HLR 118. In order to stay in the response message signaling path, ILR 109 changes the return address point code to that of ILR 109 before sending messages to HLR 118 or SMSC 105.

In this location in the network, ILR 109 intercepts all message requests and responses for roaming subscribers served by SMSC 105 whose Home MSC is HMSC 114. In the present invention, ILR 109 maintains a database of WPS subscribers whose Home MSC is HMSC 114, with WPS subscriber MIN as the database key. In the preferred embodiment, information, such as Serving MSCID, cell and sector, is extracted from Registration Notification and Registration Cancel messages and stored by ILR 109. This information is used by WPS SCP 113 in the context of a wireless prepaid service application.

Messages passed between ILR 109 and WPS SCP 113 over connection 112 do not take place in the context of normal call processing message flows, and the signaling protocol on this link can be any protocol that satisfies the application and network requirements. In the preferred embodiment, the TCP/IP protocol suite is used on connection 112.

In the preferred embodiment, ILR 109 can be any suitable platform with appropriate signaling interfaces and program logic to perform the functions described herein, for example, any suitable commercially available SCP platform.

The invention of Applicants requires the following general provisions to various network elements. For purposes of discussion of the preferred embodiment, it is assumed that WPS subscribers have HMSC 114 as their Home MSC, that roaming WPS subscribers are served by SMSC 105, and that network elements not explicitly shown behave in their normal and accepted manner.

If a local call originates from a WPS subscriber, then HMSC 114 must route the call, via provisioning, to the outgoing side of ISUP loop-around trunk 115. The outgoing IAM message will contain the WPS subscriber's dialed digits in the Called Party Number field, and the WPS Subscriber's Mobil Directory Number (MDN) in the Calling Party Number field.

If HMSC 114 receives a call with the WPS SCP 113 hotline DN in the Called Party Number field, i.e., a WPS roamer originates a call and is hotlined back to HMSC 114, HMSC 114 must route the call, using digit translations, to the outgoing side of ISUP loop-around trunk 115. The outgoing IAM contains the WPS SCP 113 hotline DN in the Called Party Number field, the WPS subscriber's MDN in the Calling Party Number field, and the digits dialed by the WPS subscriber in the Original Called Number field.

All calls terminating to WPS subscribers received by HMSC 114, other than on the incoming side of ISUP loop-around trunk 115, are routed, using digit translations, to the outgoing side of ISUP loop-around trunk 115. The outgoing IAM contains the dialed digits, i.e., the WPS subscriber's MDN, in the Called Party Number field. Calls to the WPS subscriber's MDN received by HMSC 114 on the incoming side of ISUP loop-around trunk 115 are routed, using digit translation, to the WPS subscriber using normal wireless call completion operations.

The WPS SCP 113 hotline DN is used for WPS subscribers only when they are roaming. In general, the hotline DN for a WPS subscriber is a DN based in the subscriber's Home MSC. The hotline DN may also be a "800" number that maps to a DN based in the subscriber's Home MSC.

For calls originating from a roaming subscriber, the roaming rate is generally determined as follows. WPS SCP 113 examines the received IAM to see if the WPS SCP 113 hotline number is in the Called Party Number field. If so, then the subscriber is roaming. If not, the subscriber is assumed to be in the home service area and not roaming.

If the WPS subscriber is not roaming, WPS SCP 113 sets the roaming rate to zero and proceeds with the call processing. If the WPS subscriber is roaming and has zero roaming charge service, WPS SCP 113 sets the roaming rate to zero and proceeds with the call processing. If the WPS subscriber is roaming and has fixed rate roaming service, then WPS SCP 113 sets the roaming rate to the fixed rate provisioned for the subscriber in WPS SCP 113 and proceeds with the call processing. If the WPS subscriber is roaming and has variable rate roaming service, then WPS SCP 113 determines the roaming rate based on the MSCID of SMSC 105 and the cell and sector of SMSC 105 that are currently serving the WPS subscriber.

WPS SCP 113 queries ILR 109 to determine the MSCID of SMSC 105 and cell and sector identifying information for roaming subscriber MS 100. This information is then used to determine a variable roaming rate from a rate table provisioned in WPS SCP 113. WPS SCP 113 then proceeds with the call processing.

For calls terminating to a roaming subscriber, the roaming rate is generally determined as follows. When WPS SCP 113 receives an IAM with a WPS subscriber's MDN in the Called Party Number field, it queries ILR 109 to determine if the subscriber is roaming, and if so, requests the subscriber's Serving MSCID, cell and sector. The roaming rate is based on the subscriber's roaming subscription option and the information sent from ILR 109. If the WPS subscriber has zero roaming charge service then the roaming rate is set to zero. If the WPS subscriber has fixed roaming charge service then the roaming rate is set to the fixed value. If the WPS subscriber has variable rate roaming service, then WPS SCP 113 determines the roaming rate based on the MSCID of SMSC 105 and the cell and sector of SMSC 105 that are currently serving the WPS subscriber. WPS SCP 113 then proceeds with the call processing.

WPS SCP 113 contains a database comprising the following relationships: mapping of MDN to MIN and Electronic Serial Number (ESN) for WPS subscribers, mapping of MIN to HLR Point Code, and mapping of MIN to Home MSCID for subscriber. WPS SCP 113 also supports the ability to provision a WPS subscriber to have zero, fixed, or variable rate roaming service. For variable rate roaming, a Variable Rate Roaming Table is assigned to the subscriber for use in rating calls based on the Serving MSCID and cell and sector.

ILR 109 contains a database comprising the following relationships for all WPS subscribers: mapping of MIN to Serving MSCID, mapping of MIN to HLR Point Code, mapping of MIN to Home MSCID, and mapping of MIN to "Home MSC WPS Hotline DN".

FIG. 1 also shows the general message flow of the present invention for registration of a roaming WPS subscriber served by SMSC 105 with a Home MSC at HMSC 114. The steps of the message flow are indicated on FIG. 1 and subsequent figures by circled letters.

At (a), MS 100 is powered on and transmits a registration message over radio-telecommunications link 101 to the cellular antenna serving cell 103. SMSC 105 receives registration information from the antenna that includes the MS 100 MIN and the cell and sector in which the transmission from MS 100 was received. SMSC 105 recognizes that MS 100 is a roaming subscriber and prepares a REGNOT message to send to the provisioned HLR point code address associated with the MS 100 MIN.

At (b), SMSC 105 sends the REGNOT message to the provisioned HLR point code address associated with the MS 100 MIN. In the invention of Applicants, the provisioned point code address is that of ILR 109, which receives the REGNOT message. ILR 109 compares the MS 100 MIN to its database of WPS subscribers of HMSC 114. If there is a match, ILR 109 temporarily stores the Serving MSCID, cell and sector from the REGNOT message in a buffer.

At (c), ILR 109 forwards the REGNOT message to HLR 118 using the provisioned point code address for the subscriber's HLR 118. ILR 109 modifies the REGNOT message by putting its point code into the return address point code field. HLR 118 responds to the REGNOT message in normal fashion by formulating a regnot response message.

At (d), HLR 118 sends the regnot message to ILR 109 indicating acceptance of registration using the return address point code. HLR 109 also notes the ILR as the VLR for subscriber MS 100. ILR 109 receives the regnot message and stores the temporarily stored Serving MSCID, cell and sector in the database record associated with the MS 100 MIN. ILR 109 then modifies the message such that all calls originating from MS 100 will be routed to the WPS hotline number of HMSC 114. Specifically, the Origination Indicator is set to 8, indicating all call originations from MS 100 should be routed to a single directory number, and Digits (destination) is set equal to the WPS hotline number of HMSC 114. All other parameters are passed as received.

At (e), ILR 109 sends the modified regnot message to SMSC 105. SMSC 105 then completes registration of MS 100. At this point, MS 100 is registered and able to place calls.

Figure 2:
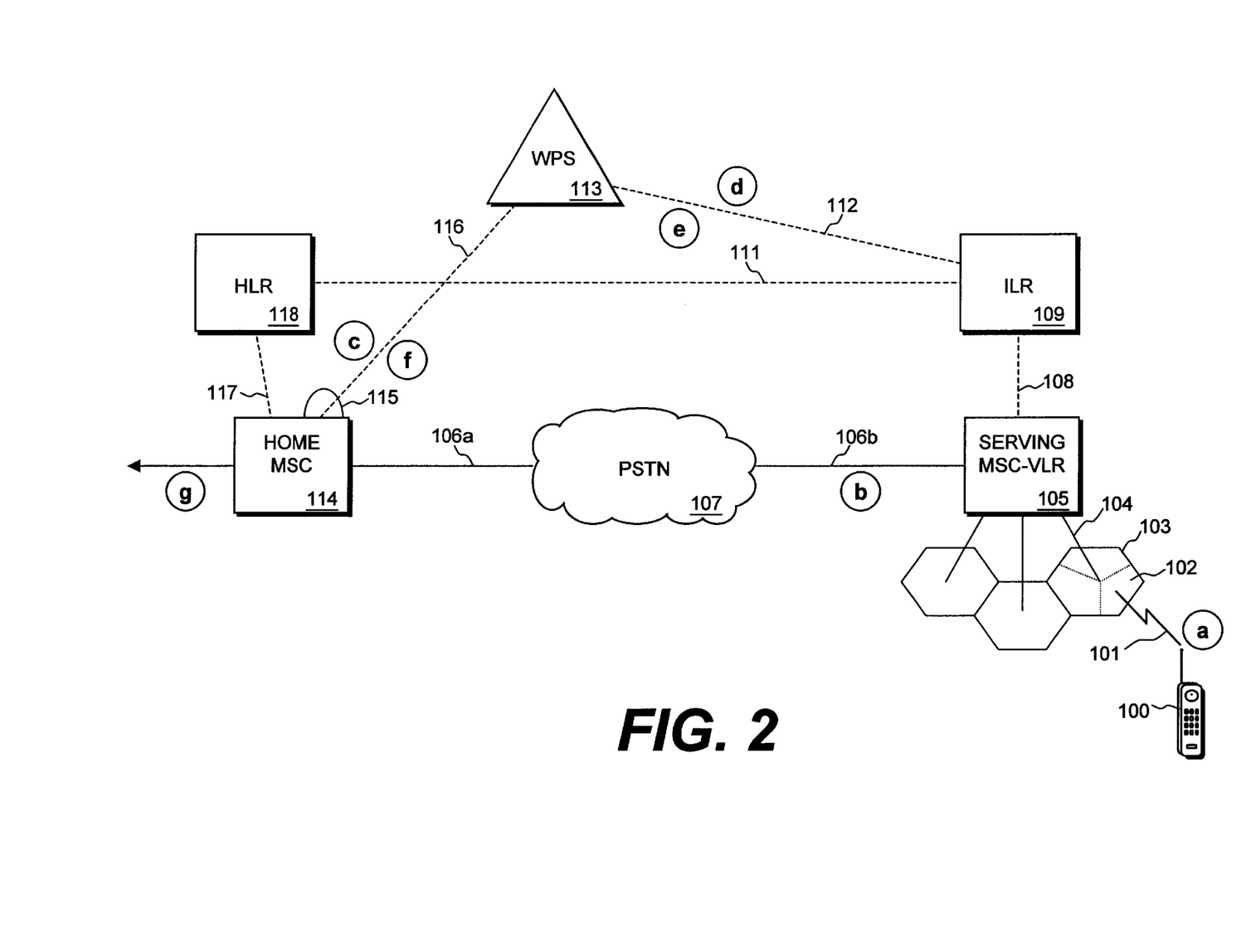
FIG. 2 shows a block diagram of the first embodiment of a wireless prepaid system of the present invention showing the general message flow for call origination from a roaming subscriber in an all ISUP network.

FIG. 2 shows a block diagram of the first embodiment of a wireless prepaid system of the present invention showing the general message flow for call origination from a roaming subscriber in an all ISUP network.

At (a), roaming subscriber MS 100 originates a call. The call information is transmitted from cell 103 to SMSC 105. SMSC 105 performs a standard call origination process for roaming subscriber MS 100 and formulates an ISUP IAM record. Based on information from the registration process, the IAM record will have the WPS hotline number of HMSC 114 in the Called Party Number field, and the digits dialed by MS 100 in the Original Called Party field.

At (b), SMSC 105 transmits the call with the IAM record over PSTN 107, via trunks 106, to HMSC 114.

At (c), based on translating the WPS hotline number in the Called Party Number field of the received IAM, HMSC 114 routes the call to the outgoing side of ISUP loop-around trunk 115 and sends the IAM record to WPS SCP 113. Based on receipt of the WPS hotline number in the Called Party Number field of the IAM message, WPS SCP 113 determines that MS 100 is roaming. WPS SCP 113 formulates a TCP/IP SEARCH message keyed for roaming subscriber MS 100 MIN.

At (d), WPS SCP 113 transmits the SEARCH message to ILR 109 over connection 112. ILR 109 does a table lookup based on MS 100 MIN and prepares a search response message that includes the MSCID of SMSC 105, and identifying information for cell 103 and sector 102.

At (e), ILR 109 transmits the search response message to WPS SCP 113 over connection 112. WPS SCP 113 uses the information in the search response message to determine a roaming charge rate. WPS SCP 113 then performs the wireless prepaid service application functions necessary to track usage and charges for roaming subscriber MS 100. WPS SCP 113 populates the Called Party Number field of the IAM record with the Original Called Number.

At (f), WPS SCP 113 transmits the IAM record to HMSC 114 over the signaling path of connection 116 that controls the inbound side of loop-around trunk 115. HMSC 114 receives the IAM record and connects the inbound side of loop-around trunk 115 to the subscriber's terminating connection.

At (g), HMSC 114 continues with normal call processing procedures for establishment of a two-way call path between roaming WPS subscriber MS 100 and the number originally dialed by MS 100.

Figure 3:
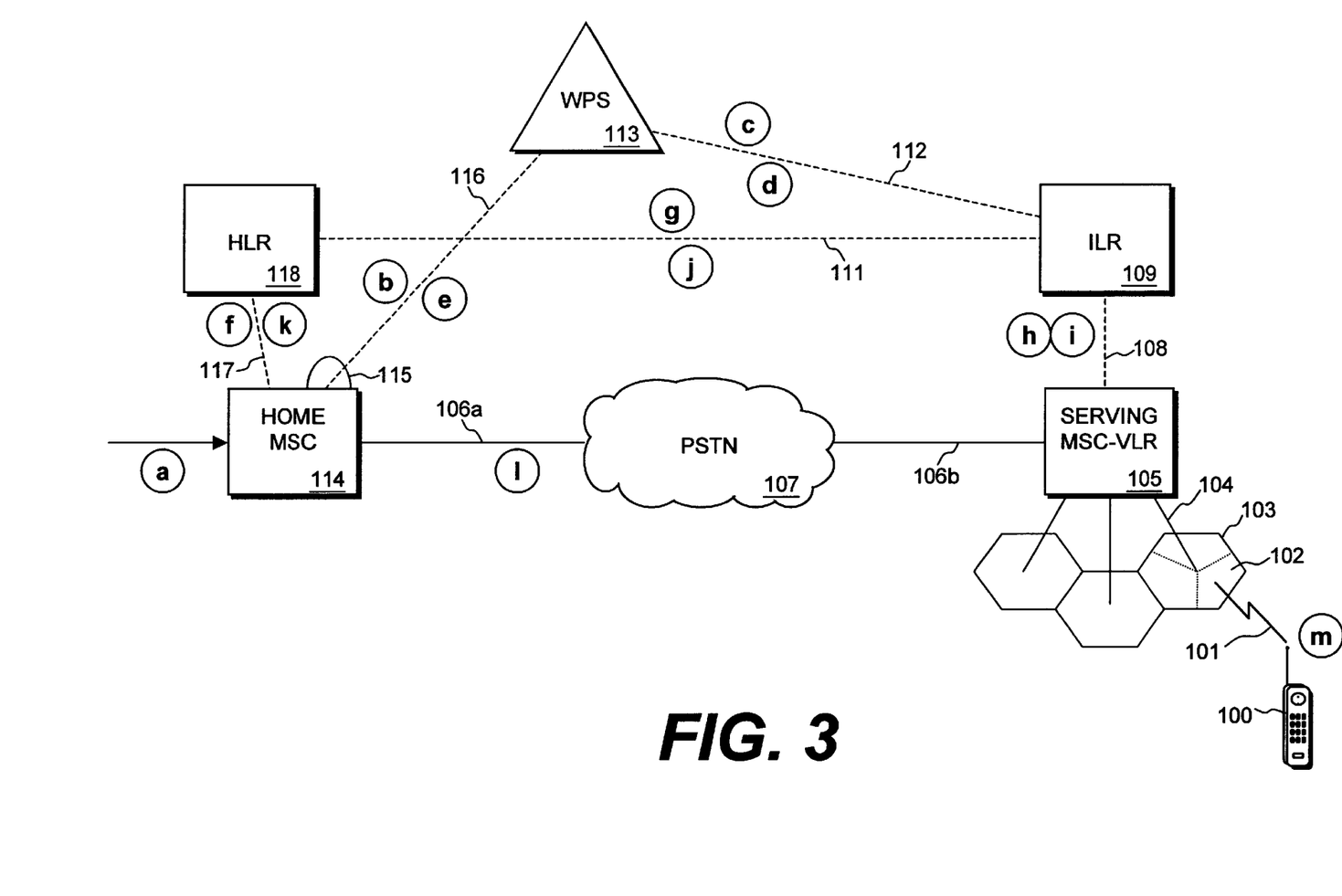
FIG. 3 shows a block diagram of the first embodiment of a wireless prepaid system of the present invention showing the general message flow for call termination to a roaming subscriber in an all ISUP network.

FIG. 3 shows the block diagram of the first embodiment of a wireless prepaid system of the present invention showing the general message flow for call termination to a roaming subscriber.

At (a), an incoming IAM message requesting a call connection to roaming subscriber MS 100 arrives at HMSC 114. HMSC 114 looks in its database, which indicates that all calls for MS 100 are to be routed to the outgoing side of loop-around trunk 115.

At (b) HMSC 114 transmits the IAM record over the signaling path of connection 116 associated with the outgoing side of ISUP loop-around trunk 115. WPS SCP 113 receives the IAM record and performs the wireless prepaid service application functions necessary to track usage and charges for the call to roaming subscriber MS 100. WPS SCP 113 determines if roaming charges apply to subscriber MS 100. If roaming charges do not apply, processing of the call continues at (e). If roaming charges apply, WPS SCP 113 formulates a TCP/IP SEARCH message keyed for roaming subscriber MS 100 MIN.

At (c), WPS SCP 113 transmits the TCP/IP SEARCH message to ILR 109 over connection 112. ILR 109 does a table lookup based on MS 100 MIN and prepares a search response message that includes the MSCID of SMSC 105 and identifying information for cell 103 and sector 102 that is serving subscriber MS 100.

At (d), ILR 109 transmits the search response message to WPS SCP 113 over connection 112. WPS SCP 113 uses the information in the search response message to determine a roaming charge rate.

At (e), WPS SCP 113 sends the unmodified IAM over the signaling path of connection 116 associated with the incoming side of the ISUP loop-around trunk 115.

At (f), HMSC 114 sends a LOCREQ message to HLR 118 over connection 117. Based on the registration of MS 100, HLR 118 prepares a ROUTEREQ message.

At (g), HLR 118 sends the ROUTEREQ message to ILR 109 over connection 111.

At (h), ILR 109 forwards the ROUTEREQ message to SMSC 105 over connection 108.

At (i), SMSC 105 sends a routereq(TLDN) response message to ILR 109 over connection 108.

At (j), ILR 109 forwards the routereq(TLDN) response message to HLR 118 over connection 111.

At (k), HLR 118 sends a locreq(TLDN) response message to HMSC 114 over connection 117.

At (l), HMSC 118 sends the IAM with the TLDN as the Called Party Number to SMSC 105 over PSTN 107 via connections 106.

At (m), SMSC 105 completes the call and establishes a radio-telecommunication connection to MS 100.

In the case where subscriber MS 100 is not roaming, i.e., the subscriber is in the home area served by HMSC 114, implying local termination at HMSC 114, an abbreviated set of the above steps would occur. At step (c), ILR 109 will respond to the SEARCH message by returning the subscriber MS 100 default MSCID value, which is set to the MSCID of HMSC 114. At step (f), because MS 100 is registered locally, HLR 118 responds to the LOCREQ message with a locreq response message to HMSC 114 indicating local termination at HMSC 114. HMSC 114 then follows normal wireless call processing procedures for a non-roaming subscriber.

Figure 4:
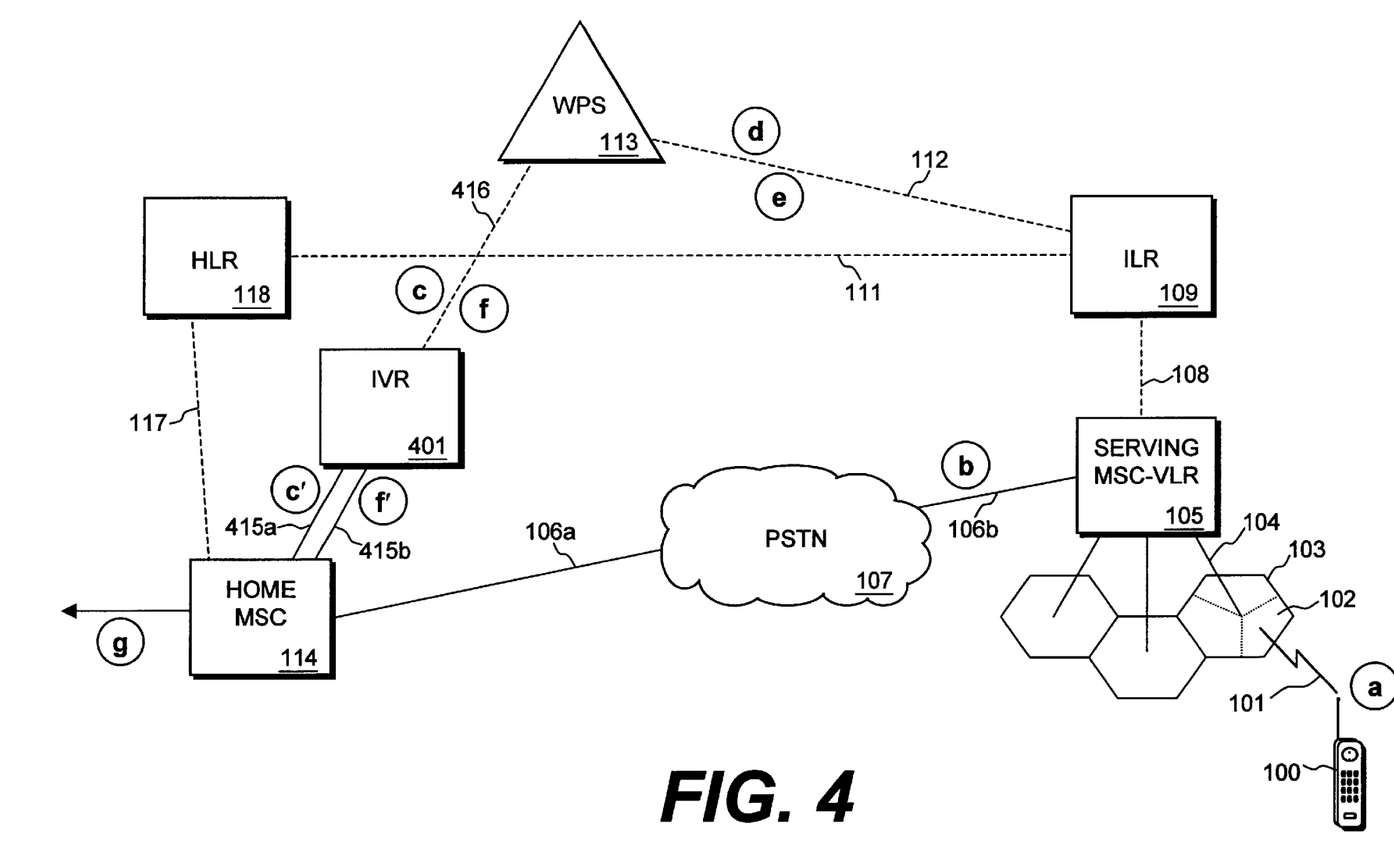
FIG. 4 shows a block diagram of a second embodiment of a wireless prepaid system of the present invention showing the general message flow for call origination from a roaming subscriber in a partial ISUP network.
Figure 5:
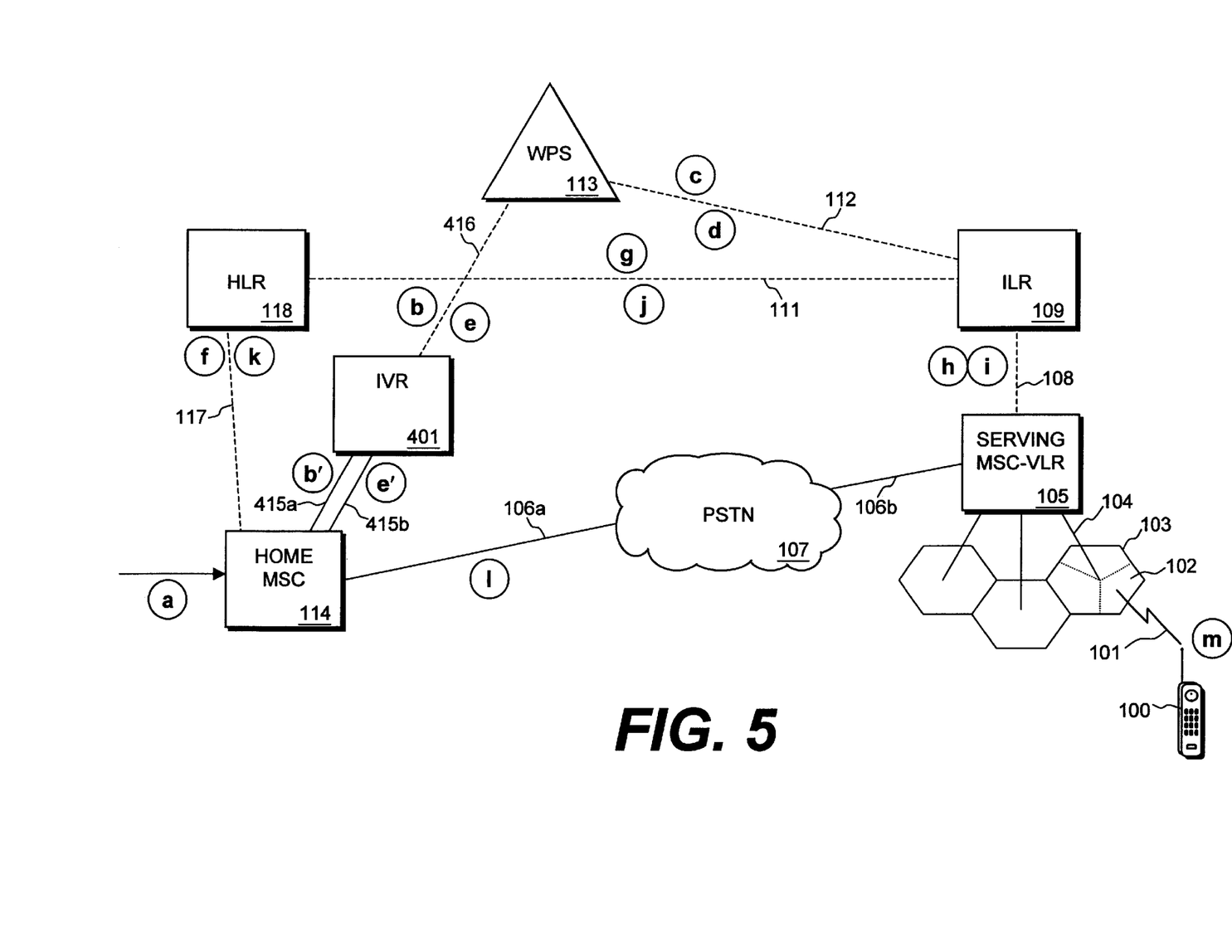
FIG. 5 shows a block diagram of the second embodiment of a wireless prepaid system of the present invention showing the general message flow for call termination to a roaming subscriber in a partial ISUP network.

FIGS. 4 and 5 show block diagrams of a second embodiment of a wireless prepaid system of the present invention showing the general message flows for call origination from and call termination to, respectively, a roaming subscriber in a network that may not support end-to-end ISUP messaging. This system is very similar to the system illustrated in FIGS. 2 and 3, and only the significant differences between the two systems will be discussed. In this system, roaming subscriber registration occurs as illustrated in FIG. 1.

In this system, an interactive voice response unit IVR 401 has been "inserted" into ISUP loop-around trunk 115, which has been "cut" to form trunks 415a and 415b, neither of which need be ISUP trunks. Also, SS7 signaling path 116 is replaced with signaling path 416, which connects IVR 401 to WPS 113. In this embodiment, the signaling protocol over link 416 may be any suitable protocol, such as TCP/IP.

In this system, an outgoing call from roaming subscriber MS 100 is hotlined to IVR 401 over trunk 415a, where the subscriber is asked by IVR 401 to re-enter the originally dialed digits. This system would be used in networks that don't support end-to-end ISUP messaging, resulting, in particular, in the inability to transport the originally dialed digits from SMSC 105 to HMSC 114. For call terminations to roaming subscriber MS 100, IVR 401 does not interact directly with subscriber MS 100, and only acts to pass signaling messages and route the call over trunks 415.

Referring to FIG. 4, the message flow is essentially the same as that described above for FIG. 2, with the exceptions noted below.

At (c'), based on translating the WPS hotline number in the called party digits field in the call setup message received at HMSC 114 over link 106a, HMSC 114 routes the call to trunk 415a and sends a call setup message to IVR 401 in a protocol appropriate to trunk 415a. IVR 401 then queries subscriber MS 100 to enter the originally dialed digits, collects the digits and inserts them into the original called number field of a call setup message.

At (c), IVR 401 transmits the call setup message to WPS SCP 113 over signaling link 416 in a protocol appropriate to link 416.

At (f), WPS SCP 113 transmits the call setup message to IVR 401.

At (f'), IVR 401 transmits the call setup message to HMSC 114, and routes the call to HMSC 114 over trunk 415b.

Referring to FIG. 5, the message flow is essentially the same as that described above for FIG. 3, with the exceptions noted below.

At (b') HMSC 114 routes the call to trunk 415a and sends the call setup message to IVR 401.

At (b), IVR 401 transmits the call setup message to WPS SCP 113 over signaling link 416.

At (e), WPS SCP 113 transmits the call setup message to IVR 401.

At (e'), IVR 401 transmits the call setup message to HMSC 114, and routes the call to HMSC 114 over trunk 415b.

As in the embodiment described in FIG. 3, if subscriber MS 100 is not roaming, then ILR 109 returns the MSCID of HMSC 114 in response to the SEARCH message. At step (f), because MS 100 is registered locally, HLR 118 responds to the LOCREQ message with a locreq response message to HMSC 114 indicating local termination at HMSC 114. HMSC 114 then follows normal wireless call processing procedures for a non-roaming subscriber.

Figure 6:
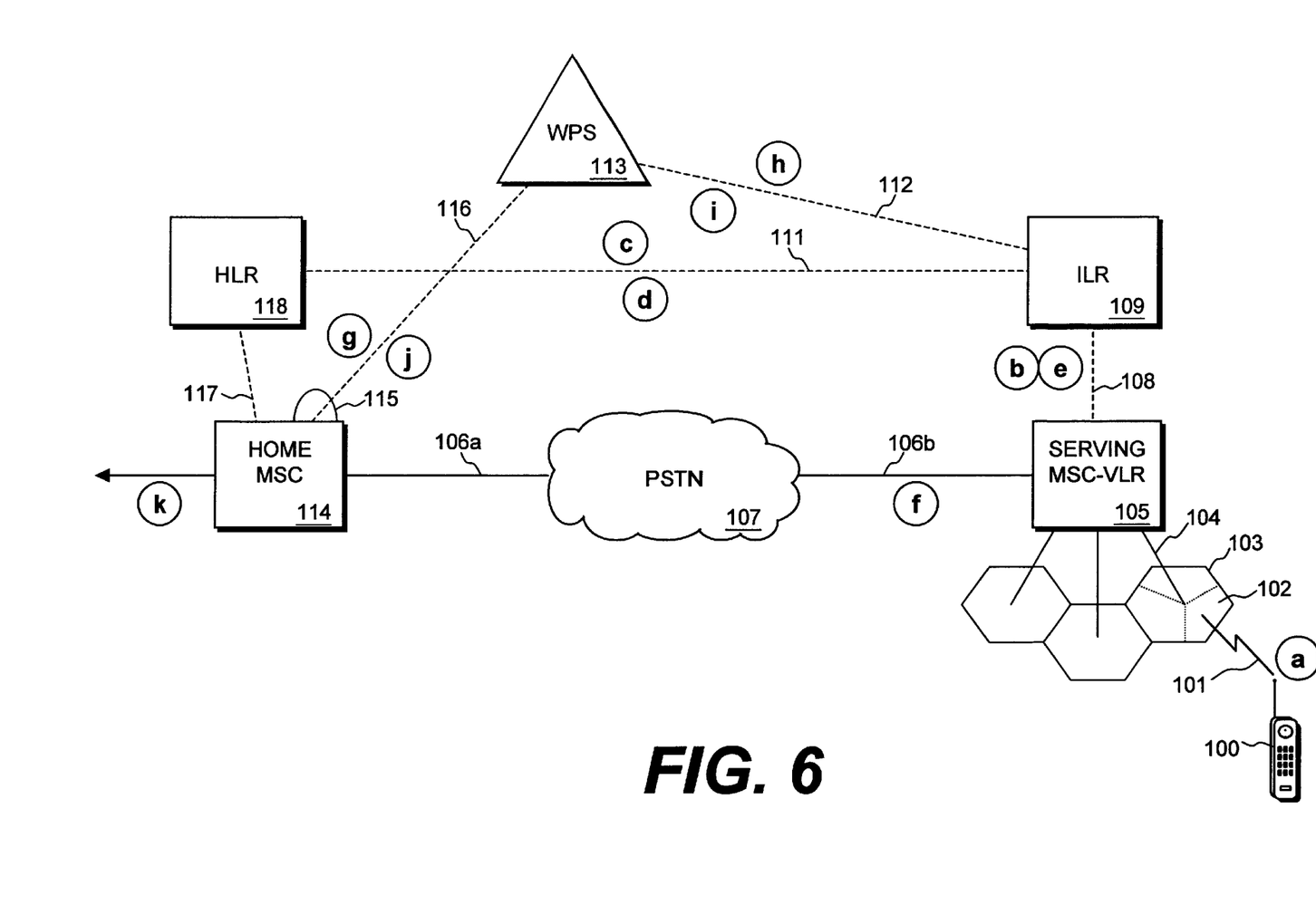
FIG. 6 shows a block diagram of the third embodiment of a wireless prepaid system of the present invention showing the general message flow for call origination from a roaming subscriber in an IS-41-C or higher network.

FIG. 6 shows a block diagram of a third embodiment of a wireless prepaid system of the present invention showing the general message flow for call origination from a roaming subscriber in an IS-41-C network, as described in Telecommunications Industry Association (TIA) standards series TIA/EIA/IS-41-C, "Cellular Radiotelecommunications Intersystem Operations," February 1996, TIA, which is hereby incorporated by reference. In this system, the originally dialed number is passed to ILR 109 in an IS-41-C Origination Request message, and stored in a table in ILR 109. Further in the call flow, WPS SCP 113 queries ILR 109 for this information, and fills in the Originally Dialed Number field of the IAM message that is subsequently sent to HMSC 114. In this manner, the originally dialed number is passed to HMSC 114 without the requirement of an all ISUP network, nor the use of an IVR as illustrated in FIG. 4.

In this embodiment, registration occurs as in FIG. 1, with the addition that OriginationTriggers is set to all call attempts for roaming subscriber MS 100 by ILR 109 if it has not already been set by HLR 118.

Referring to FIG. 6, at (a), roaming subscriber MS 100 originates a call. Because OriginationTriggers is set to all calls, SMSC 105 formulates an Origination Request (ORREQ) message.

At (b), SMSC 105 transmits the ORREQ message to ILR 109 over link 108. ILR 109 receives the ORREQ message, extracts the original dialed digits, and writes this information to a MIN-to-Original Dialed Digits mapping table.

At (c), ILR 109 transmits the ORREQ message to HLR 118 over link 111. HLR 118 formulates an orreq response message indicating that the call can proceed.

At (d), HLR 118 transmits the orreq response message to ILR 109 over link 111. ILR 109 then modifies the orreq response message by entering the WPS hotline DN into the Destination(Digits) parameter of the PSTN Termination field in the Termination List.

At (e), ILR 109 transmits the orreq response message to SMSC 105 over link 108.

At (f), SMSC 105 transmits the call over PSTN 107 via trunks 106 to HMSC 114 with an IAM record having the WPS hotline number from the orreq response message in the IAM Called Party Number field.

At (g), based on translating the WPS hotline number in the Called Party Number field of the received IAM, HMSC 114 routes the call to the outgoing side of ISUP loop-around trunk 115 and sends the IAM record to WPS SCP 113. Based on receipt of the WPS hotline number in the Called Party Number field of the IAM message, WPS SCP 113 determines that MS 100 is roaming. WPS SCP 113 formulates a TCP/IP SEARCH message keyed for roaming subscriber MS 100 MIN.

At (h), WPS SCP 113 transmits the SEARCH message to ILR 109 over connection 112. ILR 109 does a MIN-to-Original Dialed Digits table lookup based on MS 100 MIN and prepares a search response message that includes the MSCID of SMSC 105, and identifying information for cell 103 and sector 102, and the originally dialed number.

At (i), ILR 109 transmits the search response message to WPS SCP 113 over connection 112. WPS SCP 113 uses the information in the search response message to determine a roaming charge rate. WPS SCP 113 then performs the wireless prepaid service application functions necessary to track usage and charges for roaming subscriber MS 100. WPS SCP 113 populates the Called Party Number field of the IAM record with the originally dialed number from the search response message.

At (j), WPS SCP 113 transmits the IAM record to HMSC 114 over the signaling path of 116 that controls the inbound side of loop-around trunk 115. HMSC 114 receives the IAM record and routes the call through loop-around trunk 115.

At (k), HMSC 114 continues with normal call processing procedures for establishment of a two-way call path between roaming WPS subscriber MS 100 and the number originally dialed by MS 100.

Although the IS-41-C based call flow is illustrated in the context of an ISUP loop-around system as shown in FIG. 6, it will be apparent to one skilled in the art that this call flow can also be adapted to the IVR based system as shown in FIG. 4.

In all embodiments of the invention of Applicants, ILR 109 stores and maintains the subscriber's location, i.e., Serving MSCID, cell and sector, which can be used by WPS SCP 113 to determine a roaming charge rate for calls to or from subscriber MS 100. In the preferred embodiment, ILR 109 performs this function as described below.

When ILR 109 receives from SMSC 105 over link 108 a REGNOT registration notification message for subscriber MS 100, ILR 109 updates the Serving MSCID, cell and sector information from the REGNOT message in the subscriber's ILR 109 database record. ILR 109 then modifies the return address point code parameter of the REGNOT message so as to point to ILR 109, then transmits the REGNOT message to HLR 118 over link 111. Upon receipt of a regnot response message from HLR 118 indicating acceptance, ILR 109 also sends a regnot response message to SMSC 105 indicating acceptance of the REGNOT message. If HLR 118 sends a regnot response message indicating non-acceptance, ILR 109 does not update the MSCID value in the database record for MS 100 with the value temporarily stored in the buffer. ILR 109 also sends a regnot response message to SMSC 105 indicating non-acceptance.

When ILR 109 receives from HLR 118 over link 111 a REGCANC registration cancellation message, ILR 109 passes the REGCANC message to SMSC 105. When ILR 109 receives a regcanc response message from SMSC 105 indicating acceptance of the cancellation directive, ILR 109 updates the subscriber MS 100 database record to indicate that subscriber MS 100 is non-roaming. ILR 109 then modifies the return address point code parameter of the regcanc response message so as to point to ILR 109, then transmits the regcanc message to HLR 118 over link 111.

When ILR 109 receives from HLR 118 over link 111 an MS Inactive (msinact) response message, ILR 109 updates the subscriber's database record to indicate that MS 100 is non-roaming.

The default setting for subscriber records in the ILR 109 database is "non-roaming." All subscriber records are set to the default setting when, for example, ILR 109 powers up.

OTHER EMBODIMENTS

While enabling disclosures of three preferred embodiments of the present invention have been particularly described, other embodiments of the invention are within the scope of the following claims. It is intended that the scope of the invention be defined by the claims below and their equivalents. For example, ILR 109 and WPS 113 may be integrated on a single platform. In this configuration, messages exchanged over link 112 could be replaced by, for example, inter-process messaging. In the integrated configuration, the ILR and WPS processes can also share a common database. Similarly, IVR 401 and WPS 113, or IVR 401, WPS 113 and ILR 109 may be integrated on a single platform with links 416 and/or 112 served by inter-process messaging.

SMSC 105 is shown in the preferred embodiment as comprising an integrated VLR. In an equivalent embodiment, the VLR would be discrete from SMSC 105 and reside between ILR 109 and SMSC 105. To those of skill in the art, this is an obvious and well known modification to SMSC 105 of the preferred embodiment.

In the preferred embodiments, the subscriber's Home MSC 114 is shown as comprising the ISUP loop-around trunks, such as loop-around trunk 115, or being connected to an IVR 401. Those skilled in the art will recognize that any MSC in the subscriber's home network, or an MSC in a network with an appropriate agreement with the home network, can host the necessary loop-around trunk or the connection to an IVR.

In the preferred embodiment of FIG. 4, an alternative arrangement will have a signaling path between ILR 109 and IVR 401, and multiple trunks 415a and 415b. In this alternative arrangement, rather than maintaining in an ILR 109 table the hotline DN for trunk 415a, ILR 109 may query IVR 401 during subscriber registration to obtain a hotline DN. This allows for flexibility to address such concerns as traffic load to IVR 401.

The preferred embodiment of FIG. 6 may be modified to support IVR functionality such as shown in FIG. 4 or the alternative arrangement described directly above.

In the preferred embodiments, location information in the form of Serving MSCID, cell and sector is used in support of the WPS service application. Those skilled in the art will recognize that the invention of Applicants' will also support service applications that use protocols that incorporate additional location information, such as longitude and latitude coordinates.

In the preferred embodiments, information is captured from, and fields are modified in messages passed between HLR 118 and a roaming subscriber's Serving MSC 105 in support of a wireless prepaid service application. Those skilled in the art will be able to readily apply Applicants' inventive concepts of an Intercept Location Register that captures and possibly modifies fields in any message passed between HLR 118 and a roaming subscriber's Serving MSC 105 in support of a service application.

What is claimed is:

1. A system for capturing and modifying information for a roaming mobile subscriber in a wireless telecommunications network having a home location register of said roaming mobile subscriber, a serving mobile switching center of said roaming mobile subscriber, and a service application, said system comprising:

a network platform connected to said home location register, and connected to said serving mobile switching center, and connected to said service application;

said network platform operated to intercept messages exchanged between said home location register and said serving mobile switching center;

said network platform is further operated to extract and store certain information contained in said messages, said certain information relating to said roaming mobile subscriber;

said network platform is further operated to transmit said messages to their original destinations;

said network platform is further operated to update the return address point code field of certain of said messages exchanged between said home location register and said serving mobile switching center with the point code of said network platform, whereby response messages to said certain of said messages are transmitted to said network platform;

said network platform is further operated to receive from said service application a query message, and to transmit to said service application a query response message containing said certain information.

2. A system for capturing and modifying information for a roaming mobile subscriber in a wireless telecommunications network having a home location register of said roaming mobile subscriber, a serving mobile switching center of said roaming mobile subscriber, and a service application, said system comprising:

a network platform connected to said home location register, and connected to said serving mobile switching center, and connected to said service application;

said network platform operated to receive from said serving mobile switching center a registration notification message for said roaming mobile subscriber, to extract information from said registration notification message, and to store said extracted information;

said network platform further operated to update the return address point code field of said registration notification message with the point code of said network platform, and to transmit said registration notification message to said home location register;

said network platform further operated to receive from said home location register a registration notification response message associated with said registration notification message, and to transmit said registration notification response message to said serving mobile switching center;

said network platform further operated to receive from said service application a query message, and to transmit to said service application a query response message containing said extracted information.

3. A system according to claim 2, wherein said extracted information comprises mobile identification number and serving mobile switching center identification.

4. A system according to claim 2, wherein said extracted information comprises mobile identification number, serving mobile switching center identification, serving mobile switching center cell, or serving mobile switching center sector.

5. A system according to claim 2, wherein said network platform is further operated to modify certain parameters in said registration notification message just prior to transmitting said registration notification response message to said serving mobile switching center.

6. A system according to claim 5, wherein said certain parameters comprise the called party number parameter.

7. A system according to claim 5, wherein said certain parameters comprise the all calls origination trigger parameter.

8. A system according to claim 2, wherein said network platform is further operated to transmit to said service application a query message, and to receive from said service application a query response message.

9. A system according to claim 2, wherein:

said network platform is further operated to receive from said serving mobile switching center an origination request message for said roaming mobile subscriber, to extract mobile identification number and original dialed digits from said origination request message, to store said extracted mobile identification number and original dialed digits, to transmit to said home location register said origination request message, to receive from said home location register an origination request response message associated with said origination request message, and to transmit to said serving mobile switching center said origination request response message;

said network platform further operated to receive from said service application a query message, and to transmit to said service application a query response message containing said extracted information and said extracted mobile identification number and original dialed digits.

10. A method for capturing and modifying information for a roaming mobile subscriber in a wireless telecommunications network having a home location register of said roaming mobile subscriber, a serving mobile switching center of said roaming mobile subscriber, and a service application, the method implemented on a network platform, said method comprising:

intercepting messages exchanged between said home location register and said serving mobile switching center;

extracting certain information contained in said messages, said certain information relating to said roaming mobile subscriber;

storing said certain information;

transmitting said messages to their original destinations;

updating the return address point code field of certain of said messages with the point code of said network platform, whereby response messages to said certain of said messages are transmitted to said network platform;

receiving from said service application a query message; and transmitting to said service application a query response message containing said certain information.

11. A method for capturing and modifying information for a roaming mobile subscriber in a wireless telecommunications network having a home location register of said roaming mobile subscriber, a serving mobile switching center of said roaming mobile subscriber, and a service application, said method comprising:

receiving from said serving mobile switching center a registration notification message for said roaming mobile subscriber;

extracting information from said registration notification message;

storing said extracted information;

updating the return address point code field of said registration notification message with the point code of said network platform;

transmitting said registration notification message to said home location register;

receiving from said home location register a registration notification response message associated with said registration notification message;

transmitting said registration notification response message to said serving mobile switching center;

receiving from said service application a query message; and transmitting to said service application a query response message containing said extracted information.

12. A method according to claim 11, wherein said extracted information comprises mobile identification number and serving mobile switching center identification.

13. A method according to claim 11, wherein said extracted information comprises mobile identification number, serving mobile switching center identification, serving mobile switching center cell, or serving mobile switching center sector.

14. A method according to claim 11, further comprising:

transmitting to said service application a query message; and receiving from said service application a query response message.

15. A method according to claim 11, further comprising:

receiving from said serving mobile switching center an origination request message for said roaming mobile subscriber;

extracting mobile identification number and original dialed digits from said origination request message;

storing said extracted mobile identification number and original dialed digits;

transmitting to said home location register said origination request message;

receiving from said home location register an origination request response message associated with said origination request message;

transmitting to said serving mobile switching center said origination request response message;

receiving from said service application a query message; and transmitting to said service application a query response message containing said extracted information and said extracted mobile identification number and original dialed digits.

* * * * *